United States Patent
Gulati et al.

(10) Patent No.: US 12,301,495 B2
(45) Date of Patent: May 13, 2025

(54) METHOD AND APPARATUS FOR CONTROLLING OPERATION OF USER DEVICE

(71) Applicant: NOKIA SOLUTIONS AND NETWORKS OY, Espoo (FI)

(72) Inventors: Shalini Gulati, Bangalore (IN); Rajeev Agrawal, Glenview, IL (US); Suresh Kalyanasundaram, Bangalore (IN); Richa Gupta, Bangalore (IN); Jinesh P Nair, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 298 days.

(21) Appl. No.: 17/798,753

(22) PCT Filed: Feb. 12, 2020

(86) PCT No.: PCT/US2020/017878
§ 371 (c)(1),
(2) Date: Aug. 10, 2022

(87) PCT Pub. No.: WO2021/162689
PCT Pub. Date: Aug. 19, 2021

(65) Prior Publication Data
US 2023/0067024 A1 Mar. 2, 2023

(51) Int. Cl.
*H04L 5/00* (2006.01)
*H04W 24/08* (2009.01)

(52) U.S. Cl.
CPC .......... *H04L 5/0048* (2013.01); *H04W 24/08* (2013.01)

(58) Field of Classification Search
CPC .... H04L 5/0048; H04W 24/08; H04B 7/0617; H04B 17/309; H04B 17/24; H04B 17/104
See application file for complete search history.

(56) References Cited

U.S. PATENT DOCUMENTS

| 2013/0315081 A1 | 11/2013 | Kim et al. |
| 2013/0344816 A1 * | 12/2013 | Niu ..................... H04B 17/318 455/226.1 |

(Continued)

FOREIGN PATENT DOCUMENTS

| CN | 105917594 A | 8/2016 |
| WO | WO-2017086922 A1 * | 5/2017 |

OTHER PUBLICATIONS

Qualcomm Incorporated, Discussion on CSI reporting for hybrid CSI-RS, 3GPP TSG-RAN WG1 #86 Aug. 22-26, 2016 Gothenburg, Sweden, R1-166273, 3 Pages. (Year: 2016).*

(Continued)

*Primary Examiner* — Liem H. Nguyen
(74) *Attorney, Agent, or Firm* — Nokia Technologies Oy

(57) ABSTRACT

An apparatus, method and computer program is described above: determining a coupling gain for a user device within a cell of a mobile communication system; comparing the determined coupling gain with a coupling gain threshold; setting the user device to operate in a device-specific CSI-RS mode of operation in the event that the determined coupling gain is less than the coupling gain threshold, wherein, in the device-specific CSI-RS mode of operation, the user device is configured to use device-specific reference signal transmissions for the determination of channel state information; and setting the user device to operate in a cell-specific CSI-RS mode of operation in the event that the determined coupling gain is not less than the coupling gain threshold, wherein, in the cell-specific CSI-RS mode of operation, the user device is configured to use cell-specific reference signal transmissions for the determination of channel state information.

14 Claims, 9 Drawing Sheets

(56) References Cited

U.S. PATENT DOCUMENTS

| | | | | |
|---|---|---|---|---|
| 2014/0044044 | A1* | 2/2014 | Josiam | H04B 7/063 370/328 |
| 2014/0221038 | A1 | 8/2014 | Nakashima et al. | |
| 2014/0307576 | A1* | 10/2014 | Nagata | H04L 1/0001 370/252 |
| 2017/0054477 | A1* | 2/2017 | Natarajan | H04B 7/024 |
| 2018/0316404 | A1 | 11/2018 | Xu et al. | |
| 2019/0053144 | A1* | 2/2019 | Subramani | H04W 48/12 |
| 2019/0104433 | A1* | 4/2019 | Forenza | H04W 28/0236 |
| 2021/0258090 | A1* | 8/2021 | Kwak | H04W 24/10 |

OTHER PUBLICATIONS

Office action received for corresponding Chinese Patent Application No. 202080096238.2, dated Jul. 29, 2024, 6 pages of office action and 4 pages of office action/summary translation available.

Extended European Search Report dated Sep. 1, 2023, corresponding to European Patent Application No. 20918411.8.

Huawei et al: "DL L3 Mobility Procedure and RS Design", R1-1704190, vol. RAN WG1, No. Spokane, USA; Apr. 3, 2017-Apr. 7, 2017 Mar. 25, 2017 (Mar. 25, 2017).

Intel Corporation: "Discussion on CSI feedback for NR", R1-167129, vol. RAN WG1, No. Gothenburg, Sweden; Aug. 22, 2016-Aug. 26, 2016 Aug. 21, 2016 (Aug. 21, 2016).

Samsung: "Discussions on CSI-RS design for NR MIMO", R1-166778, vol. RAN WG1, No. Gothenburg, Sweden; Aug. 22, 2016-Aug. 26, 2016 Aug. 21, 2016 (Aug. 21, 2016).

International Search Report and Written Opinion dated May 18, 2020 corresponding to International Patnet Application No. PCT/US2020/017878.

Office action received for corresponding European Patent Application No. 20918411.8, dated Feb. 4, 2025, 10 pages.

* cited by examiner

METHOD AND APPARATUS FOR CONTROLLING OPERATION OF USER DEVICE

RELATED APPLICATION

This application claims priority to PCT Application No. PCT/US2020/017878, filed on Feb. 12, 2020, which is incorporated herein by reference in its entirety.

FIELD

The present specification relates to communication systems.

BACKGROUND

Downlink reference signals can be used for determining channel state information for a user device operating within a cell of a mobile communication system. There remains a need for further developments in this field.

SUMMARY

In a first aspect, this specification describes an apparatus comprising means for performing: determining (e.g. measuring) a coupling gain for a user device within a cell of a mobile communication system (for example, the user device may measure reference signals and report the measurement to the cell); comparing the determined coupling gain with a coupling gain threshold; setting the user device to operate in a device-specific CSI-RS mode of operation in the event that the determined coupling gain is less than the coupling gain threshold, wherein, in the device-specific CSI-RS mode of operation, the user device is configured to use device-specific reference signal transmissions for the determination of channel state information; and setting the user device to operate in a cell-specific CSI-RS mode of operation in the event that the determined coupling gain is not less than the coupling gain threshold, wherein, in the cell-specific CSI-RS mode of operation, the user device is configured to use cell-specific reference signal transmissions for the determination of channel state information. In some example embodiments, the means are further configured to perform: setting said coupling gain threshold.

The coupling gain threshold may be based, at least in part, on a defined coupling gain threshold based on a number of connected user devices within the cell of the mobile communication system. Furthermore, the means may be further configured to perform: determining or obtaining the number of connected users within the cell of the mobile communication system; and setting the defined coupling gain threshold depending on the number of connected users. The defined coupling gain threshold may be set periodically, but this is not essential to all example embodiments.

The coupling gain threshold may be based, at least in part, on a minimum threshold value. Further, the coupling gain threshold may be the larger of said defined coupling gain threshold and said minimum threshold value. The minimum threshold value may be a lower limit, below which device-specific CSI-RS is always used.

In some example embodiments, the set CSI-RS mode of operation may be retained whilst the user device remains within the cell of said mobile communication system (e.g. until a handover to another cell occurs).

In some example embodiments, the set CSI-RS mode of operation may be reassessed periodically or in response to an event, wherein the reassessment of the CSI-RS mode of operation is based on the coupling gain of the user device and the coupling gain threshold at the time at which the CSI-RS mode operation is reassessed.

In some example embodiments, the means are further configured to perform: providing downlink reference signal transmissions in accordance with the set CSI-RS mode of operation; and determining channel state information in response to the provided downlink reference signal transmissions.

In some example embodiments, all user devices within a cell operating in the device-specific CSI-RS mode of operation use orthogonal resources (e.g. orthogonal downlink resources) for CSI-RS reference signal transmissions. In some example embodiments, all user devices within a cell operating in the cell-specific CSI-RS mode of operation use the same resources (e.g. the same downlink resources) for CSI-RS reference signal transmissions.

The said means may comprise: at least one processor; and at least one memory including computer program code, the at least one memory and the computer program configured, with the at least one processor, to cause the performance of the apparatus.

In a second aspect, this specification describes a system comprising: a plurality of user devices operating within a cell of a mobile communication system, wherein: one or more of said user devices are configured to operate in a device-specific CSI-RS mode of operation in which the respective user devices use device-specific reference signal transmissions for the determination of channel state information; and one or more of said user devices are configured to operate in a cell-specific CSI-RS mode of operation in which the respective user devices use cell-specific reference signal transmissions for the determination of channel state information, wherein: user devices operate in the device-specific CSI-RS mode of operation in the event that a determined coupling gain for the user device for the respective user device is less than the coupling gain threshold; and user devices operate in the cell-specific CSI-RS mode of operation in the event that the determined coupling gain for the respective user device is not less than the coupling gain threshold.

The respective coupling gain thresholds may be based, at least in part, on a defined coupling gain threshold based on a number of connected user devices within the cell of the mobile communication system. The defined coupling gain threshold may be set periodically, but this is not essential to all example embodiments.

The respective coupling gain thresholds may be based, at least in part, on a minimum threshold value. Further, the coupling gain threshold may be the larger of said defined coupling gain threshold and said minimum threshold value. The minimum threshold value may be a lower limit, below which device-specific CSI-RS is always used.

In some example embodiments, the set CSI-RS mode of operation for a user device may be retained whilst said user device remains within the cell of said mobile communication system (e.g. until a handover to another cell occurs).

In some example embodiments, the set CSI-RS mode of operation for a user device may be reassessed periodically or in response to an event, wherein the reassessment of the CSI-RS mode of operation is based on the coupling gain of the user device and the coupling gain threshold at the time at which the CSI-RS mode operation is reassessed.

In some example embodiments, all user devices within a cell operating in the device-specific CSI-RS mode of operation use orthogonal resources (e.g. orthogonal downlink resources) for CSI-RS reference signal transmissions. In some example embodiments, all user devices within a cell operating in the cell-specific CSI-RS mode of operation use the same resources (e.g. the same downlink resources) for CSI-RS reference signal transmissions.

In a third aspect, this specification describes a method comprising: determining a coupling gain for a user device within a cell of a mobile communication system; comparing the determined coupling gain with a coupling gain threshold; setting the user device to operate in a device-specific CSI-RS mode of operation in the event that the determined coupling gain is less than the coupling gain threshold, wherein, in the device-specific CSI-RS mode of operation, the user device is configured to use device-specific reference signal transmissions for the determination of channel state information; and setting the user device to operate in a cell-specific CSI-RS mode of operation in the event that the determined coupling gain is not less than the coupling gain threshold, wherein, in the cell-specific CSI-RS mode of operation, the user device is configured to use cell-specific reference signal transmissions for the determination of channel state information. Some example embodiments further comprise setting said coupling gain threshold.

The coupling gain threshold may be based, at least in part, on a defined coupling gain threshold based on a number of connected user devices within the cell of the mobile communication system. Furthermore, the method may comprise: determining or obtaining the number of connected users within the cell of the mobile communication system; and setting the defined coupling gain threshold depending on the number of connected users. The defined coupling gain threshold may be set periodically, but this is not essential to all example embodiments.

The coupling gain threshold may be based, at least in part, on a minimum threshold value. Further, the coupling gain threshold may be the larger of said defined coupling gain threshold and said minimum threshold value. The minimum threshold value may be a lower limit, below which device-specific CSI-RS is always used.

In some example embodiments, the set CSI-RS mode of operation may be retained whilst the user device remains within the cell of said mobile communication system (e.g. until a handover to another cell occurs).

In some example embodiments, the set CSI-RS mode of operation may be reassessed periodically or in response to an event, wherein the reassessment of the CSI-RS mode of operation is based on the coupling gain of the user device and the coupling gain threshold at the time at which the CSI-RS mode operation is reassessed.

Some example embodiments further comprise: providing downlink reference signal transmissions in accordance with the set CSI-RS mode of operation; and determining channel state information in response to the provided downlink reference signal transmissions.

In some example embodiments, all user devices within a cell operating in the device-specific CSI-RS mode of operation use orthogonal resources (e.g. orthogonal downlink resources) for CSI-RS reference signal transmissions. In some example embodiments, all user devices within a cell operating in the cell-specific CSI-RS mode of operation use the same resources (e.g. the same downlink resources) for CSI-RS reference signal transmissions.

In a fourth aspect, this specification describes a method comprising: operating a first group of one or more user devices within a cell of a mobile communication system in a device-specific CSI-RS mode of operation in which the user devices of the first group use device-specific reference signal transmissions for the determination of channel state information, wherein user devices operate in the device-specific CSI-RS mode of operation in the event that a determined coupling gain for the respective user device is less than a coupling gain threshold; and operating a second group of one or more said user devices within the cell of the mobile communication system in a cell-specific CSI-RS mode of operation in which the user devices of the second group use cell-specific reference signal transmissions for the determination of channel state information, wherein user devices operate in the cell-specific CSI-RS mode of operation in the event that the determined coupling gain for the respective user device is not less than the coupling gain threshold.

The respective coupling gain thresholds may be based, at least in part, on a defined coupling gain threshold based on a number of connected user devices within the cell of the mobile communication system. The defined coupling gain threshold may be set periodically, but this is not essential to all example embodiments.

The respective coupling gain thresholds may be based, at least in part, on a minimum threshold value. Further, the coupling gain threshold may be the larger of said defined coupling gain threshold and said minimum threshold value. The minimum threshold value may be a lower limit, below which device-specific CSI-RS is always used.

In some example embodiments, the set CSI-RS mode of operation for a user device may be retained whilst said user device remains within the cell of said mobile communication system (e.g. until a handover to another cell occurs).

In some example embodiments, the set CSI-RS mode of operation for a user device may be reassessed periodically or in response to an event, wherein the reassessment of the CSI-RS mode of operation is based on the coupling gain of the user device and the coupling gain threshold at the time at which the CSI-RS mode operation is reassessed.

In some example embodiments, all user devices within a cell operating in the device-specific CSI-RS mode of operation use orthogonal resources (e.g. orthogonal downlink resources) for CSI-RS reference signal transmissions. In some example embodiments, all user devices within a cell operating in the cell-specific CSI-RS mode of operation use the same resources (e.g. the same downlink resources) for CSI-RS reference signal transmissions.

In a fifth aspect, this specification describes an apparatus configured to perform any method as described with reference to the third or fourth aspects.

In a sixth aspect, this specification describes computer-readable instructions which, when executed by computing apparatus, cause the computing apparatus to perform any method as described with reference to the third or fourth aspects.

In a seventh aspect, this specification describes a computer program comprising instructions for causing an apparatus to perform at least the following: determining a coupling gain for a user device within a cell of a mobile communication system; comparing the determined coupling gain with a coupling gain threshold; setting the user device to operate in a device-specific CSI-RS mode of operation in the event that the determined coupling gain is less than the coupling gain threshold, wherein, in the device-specific CSI-RS mode of operation, the user device is configured to use device-specific reference signal transmissions for the determination of channel state information; and setting the user device to operate in a cell-specific CSI-RS mode of operation in the event that the determined coupling gain is not less than the coupling gain threshold, wherein, in the cell-specific CSI-RS mode of operation, the user device is configured to use cell-specific reference signal transmissions for the determination of channel state information. Some example embodiments further comprise setting said coupling gain threshold.

In an eighth aspect, this specification describes a computer program comprising instructions for causing an apparatus to perform at least the following: operating a first group of one or more user devices within a cell of a mobile communication system in a device-specific CSI-RS mode of operation in which the user devices of the first group use device-specific reference signal transmissions for the determination of channel state information, wherein user devices operate in the device-specific CSI-RS mode of operation in the event that a determined coupling gain for the respective user device is less than a coupling gain threshold; and operating a second group of one or more said user devices within the cell of the mobile communication system in a cell-specific CSI-RS mode of operation in which the user devices of the second group use cell-specific reference signal transmissions for the determination of channel state information, wherein user devices operate in the cell-specific CSI-RS mode of operation in the event that the determined coupling gain for the respective user device is not less than the coupling gain threshold.

In a ninth aspect, this specification describes a computer-readable medium (such as a non-transitory computer-readable medium) comprising program instructions stored thereon for performing at least the following: determining a coupling gain for a user device within a cell of a mobile communication system; comparing the determined coupling gain with a coupling gain threshold; setting the user device to operate in a device-specific CSI-RS mode of operation in the event that the determined coupling gain is less than the coupling gain threshold, wherein, in the device-specific CSI-RS mode of operation, the user device is configured to use device-specific reference signal transmissions for the determination of channel state information; and setting the user device to operate in a cell-specific CSI-RS mode of operation in the event that the determined coupling gain is not less than the coupling gain threshold, wherein, in the cell-specific CSI-RS mode of operation, the user device is configured to use cell-specific reference signal transmissions for the determination of channel state information. Some example embodiments further comprise setting said coupling gain threshold.

In a tenth aspect, this specification describes a computer-readable medium (such as a non-transitory computer-readable medium) comprising program instructions stored thereon for performing at least the following: operating a first group of one or more user devices within a cell of a mobile communication system in a device-specific CSI-RS mode of operation in which the user devices of the first group use device-specific reference signal transmissions for the determination of channel state information, wherein user devices operate in the device-specific CSI-RS mode of operation in the event that a determined coupling gain for the respective user device is less than a coupling gain threshold; and operating a second group of one or more said user devices within the cell of the mobile communication system in a cell-specific CSI-RS mode of operation in which the user devices of the second group use cell-specific reference signal transmissions for the determination of channel state information, wherein user devices operate in the cell-specific CSI-RS mode of operation in the event that the determined coupling gain for the respective user device is not less than the coupling gain threshold.

In an eleventh aspect, this specification describes an apparatus comprising: at least one processor; and at least one memory including computer program code which, when executed by the at least one processor, causes the apparatus to: determine a coupling gain for a user device within a cell of a mobile communication system; compare the determined coupling gain with a coupling gain threshold; set the user device to operate in a device-specific CSI-RS mode of operation in the event that the determined coupling gain is less than the coupling gain threshold, wherein, in the device-specific CSI-RS mode of operation, the user device is configured to use device-specific reference signal transmissions for the determination of channel state information; and setting the user device to operate in a cell-specific CSI-RS mode of operation in the event that the determined coupling gain is not less than the coupling gain threshold, wherein, in the cell-specific CSI-RS mode of operation, the user device is configured to use cell-specific reference signal transmissions for the determination of channel state information. Some example embodiments further comprise setting said coupling gain threshold.

In a twelfth aspect, this specification describes an apparatus comprising: at least one processor; and at least one memory including computer program code which, when executed by the at least one processor, causes the apparatus to: operate a first group of one or more user devices within a cell of a mobile communication system in a device-specific CSI-RS mode of operation in which the user devices of the first group use device-specific reference signal transmissions for the determination of channel state information, wherein user devices operate in the device-specific CSI-RS mode of operation in the event that a determined coupling gain for the respective user device is less than a coupling gain threshold; and operate a second group of one or more said user devices within the cell of the mobile communication system in a cell-specific CSI-RS mode of operation in which the user devices of the second group use cell-specific reference signal transmissions for the determination of channel state information, wherein user devices operate in the cell-specific CSI-RS mode of operation in the event that the determined coupling gain for the respective user device is not less than the coupling gain threshold.

In a thirteenth aspect, this specification describes an apparatus comprising: means (such as a first processor) for determining a coupling gain for a user device within a cell of a mobile communication system; means (such as a comparator) for comparing the determined coupling gain with a coupling gain threshold; means (such as a first output) for setting the user device to operate in a device-specific CSI-RS mode of operation in the event that the determined coupling gain is less than the coupling gain threshold, wherein, in the device-specific CSI-RS mode of operation, the user device is configured to use device-specific reference signal transmissions for the determination of channel state information; and means (such as the first output) for setting the user device to operate in a cell-specific CSI-RS mode of operation in the event that the determined coupling gain is not less than the coupling gain threshold, wherein, in the cell-specific CSI-RS mode of operation, the user device is configured to use cell-specific reference signal transmissions for the determination of channel state information. Some example embodiments further comprise setting said coupling gain threshold.

In a fourteenth aspect, this specification describes an apparatus comprising: means (such as a control module) for operating a first group of one or more user devices within a cell of a mobile communication system in a device-specific CSI-RS mode of operation in which the user devices of the first group use device-specific reference signal transmissions for the determination of channel state information, wherein user devices operate in the device-specific CSI-RS mode of operation in the event that a determined coupling gain for the respective user device is less than a coupling gain threshold; and means (such as the said control module) operating a second group of one or more said user devices within the cell of the mobile communication system in a cell-specific CSI-RS mode of operation in which the user devices of the second group use cell-specific reference signal transmissions for the determination of channel state information, wherein user devices operate in the cell-specific CSI-RS mode of operation in the event that the determined coupling gain for the respective user device is not less than the coupling gain threshold.

BRIEF DESCRIPTION OF THE DRAWINGS

Example embodiments will now be described, by way of example only, with reference to the following schematic drawings, in which.

DETAILED DESCRIPTION

Figure 1:
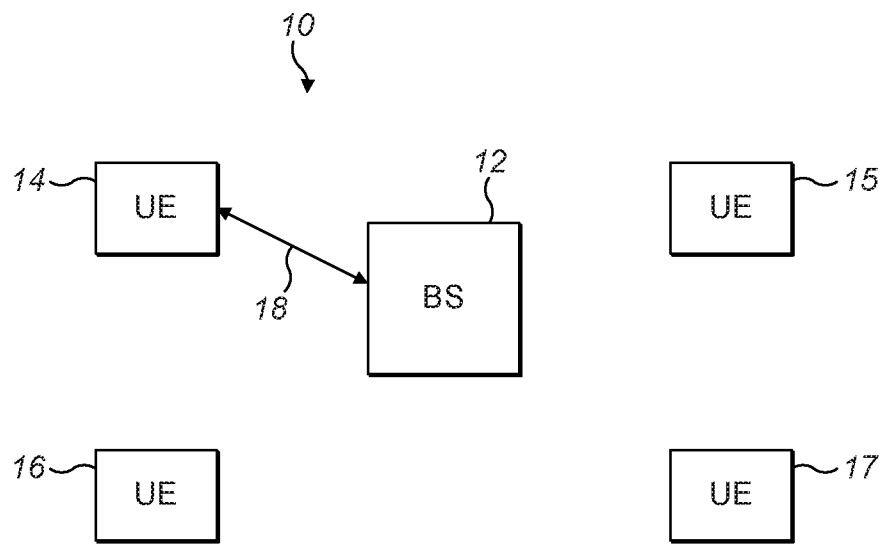
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. The system shows part of a mobile communication cell comprising a base station 12 and first to fourth user devices 14 to 17 in communication with the base station.

In the system 10, the first user device 14 is using downlink reference signal transmissions (specifically channel state information reference signal (CSI-RS) transmissions 18) to estimate the downlink channel and report the CSI (Channel State Information) including, for example, PMI (Precoding Matrix Indicator), CQI (Channel Quality Indicator) and RI (Rank Indicator) to the cell. The channel state information reported by the user device 14 may be used to determine the rank of the transmission, the precoder, and the Modulation and Coding Scheme (MCS) of the data transmissions to the user on the downlink.

The CSI-RS transmissions 18 may take the form of cell-specific CSI-RS transmissions or device-specific CSI-RS transmission.

If cell-specific CSI-RS transmissions are used, all relevant user devices within a cell use the same downlink resources for CSI-RS reference signal transmissions. Thus, a cell does not need to allocate independent, mutually-exclusive downlink resources for CSI-RS transmissions to every Radio Resource Control (RRC) connected user in the cell. Instead, the same CSI-RS resource (transmitted periodically, for example) can be used by all connected user devices in the cell to estimate their respective channels.

If device-specific CSI-RS transmissions are used, all relevant user devices within a cell typically use orthogonal downlink resources for CSI-RS reference signal transmissions. Thus, the CSI-RS transmissions to each user device will be performed on user-specific beams, such as the best eigen beam(s) for the user, or the user's best refined grid-of-beams (GoB) beam(s). This may result in a larger beamforming gain and higher SINR (Signal to Interference and Noise Ratio) for the user device, resulting in a better throughput performance for the user device. However, device-specific CSI-RS transmissions typically require mutually-exclusive CSI-RS resources for each one of the RRC connected users in the cell, thus adversely impacting the user throughput performance in the event of there being a large number of RRC connected users.

Figure 2:
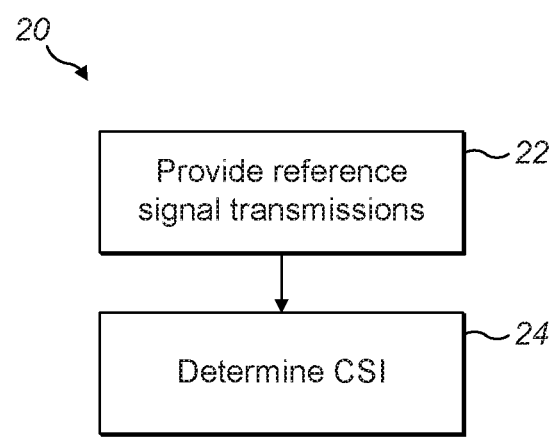
FIG. 2 is a flowchart showing an algorithm in accordance with an example embodiment.

FIG. 2 is a flowchart showing an algorithm, indicated generally by the reference numeral 20, in accordance with an example embodiment.

The algorithm 20 starts at operation 22, where downlink reference signal transmissions are provided in accordance with a CSI-RS mode of operation (e.g. cell-specific or device-specific CSI-RS).

At operation 24, channel state information (CSI) is determined in response to the downlink reference signal transmissions provided in operation 22.

Figure 3:
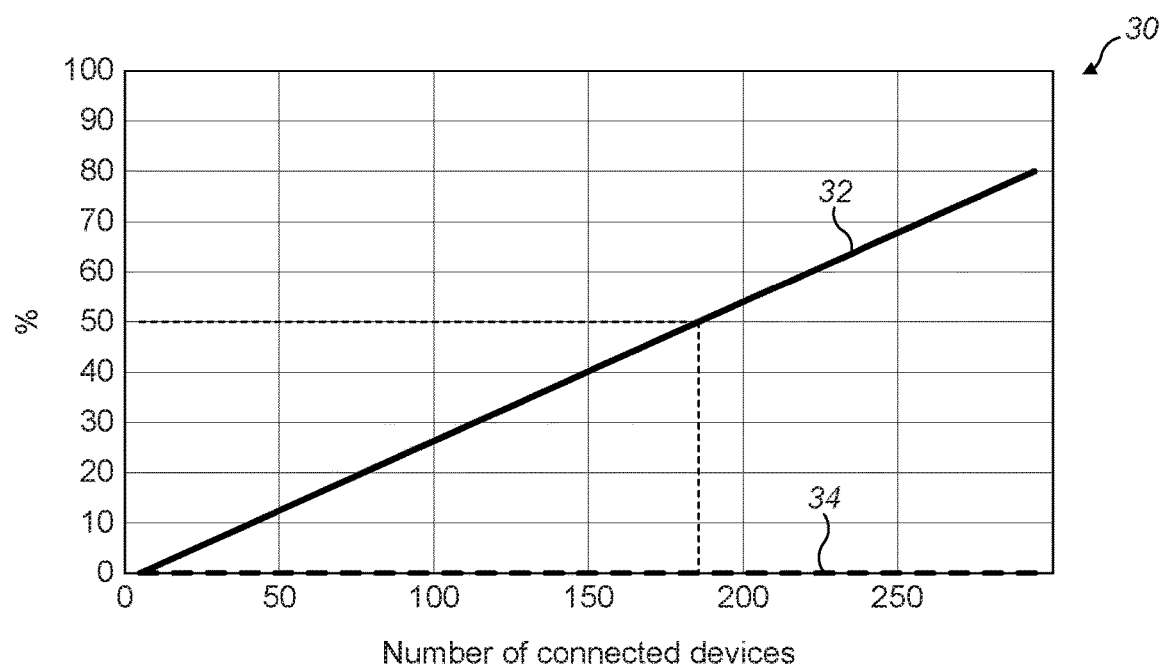
FIGS. 3 to 6 are plots in accordance with example embodiments.

FIG. 3 is a plot, indicated generally by the reference numeral 30, in accordance with an example embodiment. The plot 30 plots the percentage of downlink resources used to implement device-specific CSI (plot 32) and cell-specific CSI (plot 34) against the number of connected devices.

As discussed above, independent, mutually-exclusive resources are used for transmitting device-specific CSI-RS. Thus, when device-specific CSI-RS is used, the overhead increases linearly with the number of RRC connected users in the cell (as indicated by the plot 32). For example, as shown in example of FIG. 3, for an example CSI-RS configuration, with just 180 RRC connected users in the cell, 50% of the available downlink resource will be used for CSI-RS transmissions. Clearly, if hundreds or even thousands of users are assigned to a cell, the use of device-specific CSI-RS transmissions within that cell can become impractical.

In contrast, this overhead is limited to less than about 1% of available downlink resource when cell-specific CSI-RS transmissions are used instead (see the plot 34). Thus, the CSI-RS overhead when using cell-specific CSI-RS transmissions is negligible.

Figure 4:
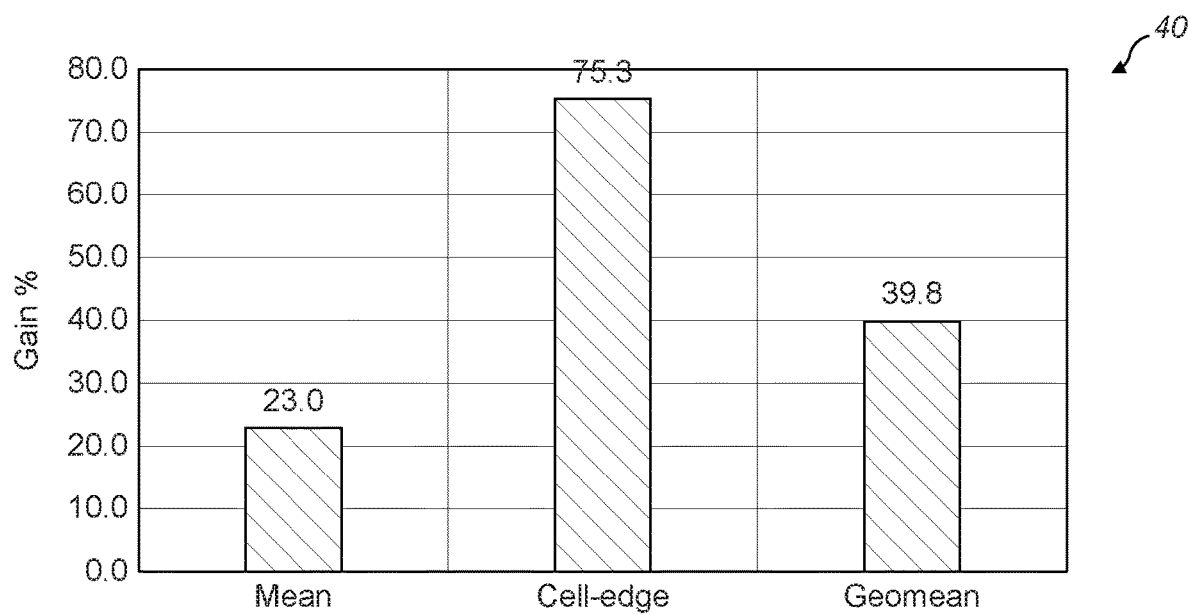

FIG. 4 is a plot, indicated generally by the reference numeral 40, in accordance with an example embodiment. The plot 40 shows a comparison of gains in system performance with device-specific CSI-RS when compared with cell-specific CSI-RS in a system in which there are 10 RRC connected devices in the cell. The plot 40 is based on 10 RRC connected devices, such that the overhead incurred by assigning device-specific CSI-RS resources to a user device is small.

As shown in the plot 40, using cell-specific CSI-RS transmissions typically results in a worse geometric mean performance, when the number of RRC connected user devices is small (10 in this case). Simulation data shows that for large inter-site distances, the cell-edge throughput can be poor with the use of cell-specific CSI-RS, but with the use of device-specific CSI-RS, the user can obtain a reasonable throughput. This is because of the use of cell-specific beams that would have a poorer beamforming gain in the direction of the user due to the use of cell-specific CSI-RS transmissions. The sector-specific beams coupled with a split-panel architecture used for cell-specific CSI-RS transmissions have lower beamforming gains limiting the coverage area of the beam and resulting in lower performance with cell-specific CSI-RS. On the other hand, device-specific CSI-RS results in better performance because of the use of device-specific beams, such as, the best eigen beam(s) of the user or user's best GoB beam(s). This results in a better matching of the beam in the direction of the user's channel, resulting in a better SINR and throughput for the user.

Thus, with a small number of RRC connected devices (such that the overhead incurred by using device-specific CSI-RS is low), using device-specific CSI-RS resources can result in significant gains in system performance, due to better beamforming gains due to a better match of the user's beam with the user's channel.

Figure 5:
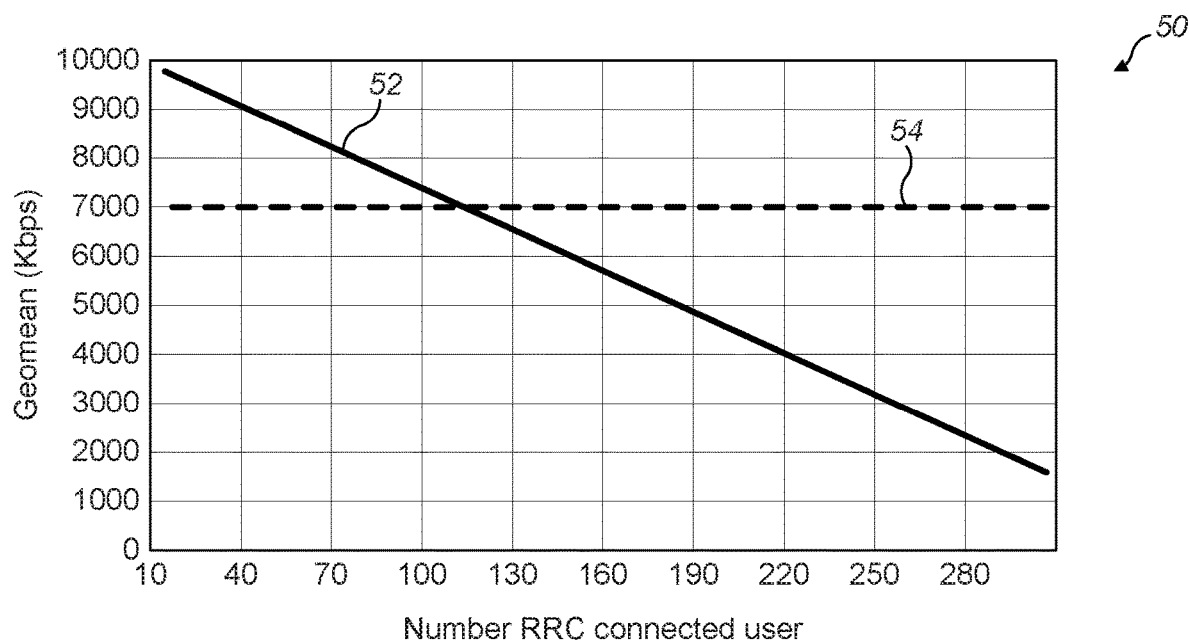

FIG. 5 is a plot, indicated generally by the reference numeral 50, in accordance with an example embodiment. The plot 50 shows a comparison of the geomean of user throughout with the number of RRC connected users. The plot includes a first plot 52 where device-specific CSI-RS transmissions are used and a second plot 54 where cell-specific CSI-RS transmissions are used.

As discussed above, CSI-RS overhead with device-specific CSI-RS transmissions increases with increase in number of RRC connected users. As shown by the first plot 52, the user throughput performance reduces with increased numbers of RRC connected user devices when device-specific CSI-RS transmissions are used. The plots 52 and 54 show that the performance of device-specific CSI-RS is better than that of cell-specific CSI-RS for smaller numbers of connected user devices, but as the number of connected devices increases, the performance of device-specific CSI-RS transmissions degrades linearly, and eventually the cell-specific CSI-RS scheme outperforms the device-specific CSI-RS. In the simulated data shown in FIG. 5, with 300 RRC connected users, the geometric mean of throughputs with device-specific CSI-RS was about 75% lower than that of the cell-specific CSI-RS scheme.

Figure 6:
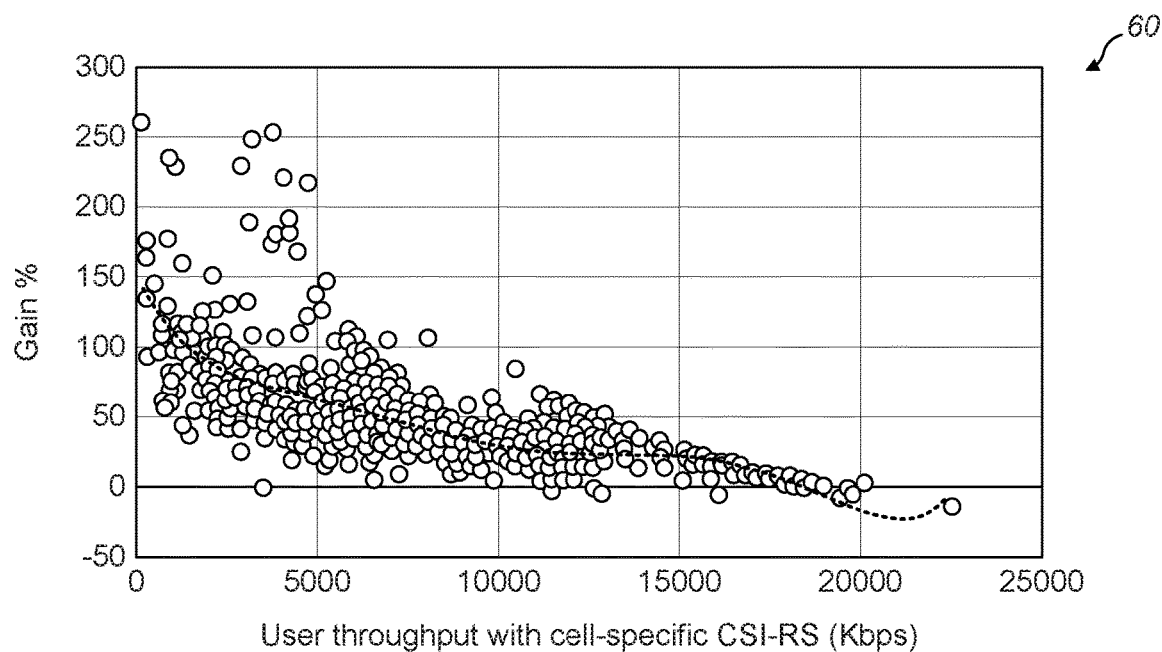

FIG. 6 is a plot, indicated generally by the reference numeral 60, in accordance with an example embodiment. The plot 60 shows a comparison of gains in user throughput with device-specific CSI-RS when compared with cell-specific CSI-RS for different numbers of RRC connected devices in the cell.

The plot 60 shows the gains in user throughput when all users in the cell use device-specific CSI-RS instead of cell-specific CSI-RS (but ignores the CSI-RS overhead). This enables a determination to be made regarding which user devices benefit most from using device-specific CSI-RS. It is found that user devices with a lower throughput with cell-specific CSI-RS are the ones that obtain larger gains with the use of device-specific CSI-RS. This is because, with device-specific CSI-RS, reference signals are better matched to the user's dominant channel direction, resulting in a higher SINR and thus better throughput. Since cell-edge user device generally have poorer throughput to begin with, their percentage gains tend to be larger.

Based on these results, it can be concluded that the cell-edge user devices are the ones that should preferentially receive device-specific CSI-RS configuration. Thus, as described in detail below, a hybrid CSI-RS scheme may be designed, in which user devices with a coupling gain less than a threshold value use device-specific CSI-RS transmissions, whereas other users use cell-specific CSI-RS transmissions.

Figure 7:
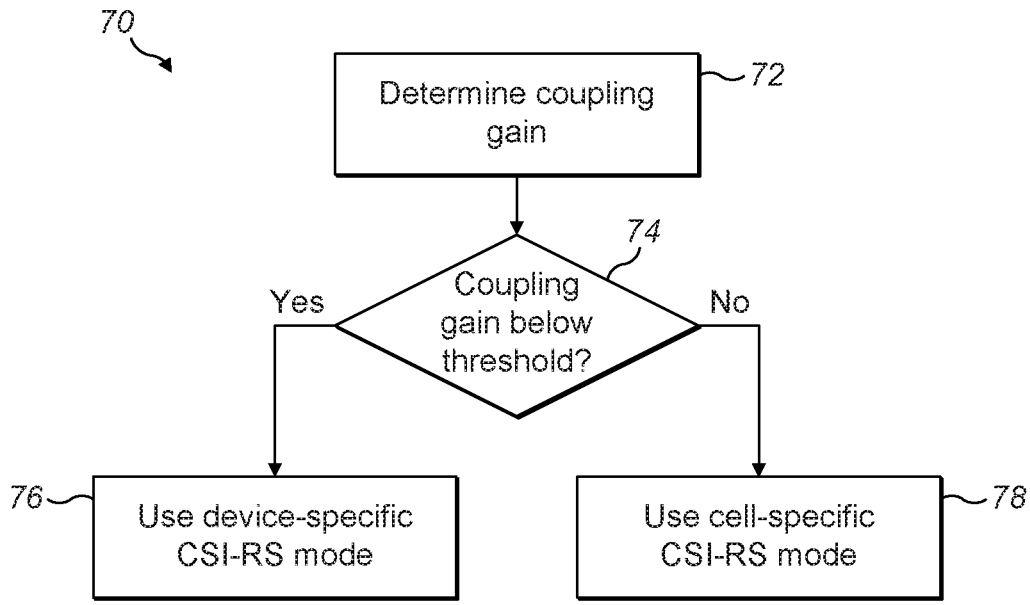
FIGS. 7 to 9 are flowcharts showing algorithms in accordance with example embodiments.

FIG. 7 is a flowchart showing an algorithm, indicated generally by the reference numeral 70, in accordance with an example embodiment. The algorithm 70 is an example of a hybrid CSI-RS scheme.

At operation 72, a coupling gain is determined (e.g. measured) for a user device within a cell of a mobile communication system. In general, a user device measures reference signals and reports the measurement to the base station. By way of example, the operation 72 may be implemented for a user device when that user device first enters a cell.

The coupling gain may be defined as the gain from the transmitter to the receiver taking into account the attenuation in the transmitted signal due to distance between devices and the transmitter and receiver antenna gains, and is therefore inversely proportional to the pathloss.

At operation 74, the coupling gain determined in operation 72 is compared with a coupling gain threshold. (An example method for setting the coupling gain threshold is described below.)

If the determined coupling gain is less than the coupling gain threshold, then the algorithm 70 moves to operation 76, where the user device is set to operate in a device-specific CSI-RS mode of operation. In the device-specific CSI-RS mode of operation, the user device is configured to use device-specific reference signal transmissions for the determination of channel state information.

If the determined coupling gain is not less than the coupling gain threshold, then the algorithm 70 moves to operation 78, where the user device is set to operate in a cell-specific CSI-RS mode of operation. In the cell-specific CSI-RS mode of operation, the user device is configured to use cell-specific reference signal transmissions for the determination of channel state information.

Once set (in either the operation 76 or the operation 78), the CSI-RS mode operation may be retained by a user device until it leaves the cell. In another embodiment, the coupling gain may be re-checked periodically on in an event-triggered fashion to determine if the CSI-RS configuration should be changed for a given device (e.g. based on the coupling gain of the user device and the coupling gain threshold at the time at which the CSI-RS mode operation is reassessed).

The algorithm 70 thereby provides a hybrid CSI-RS scheme that has some of the advantages of cell-specific CSI-RS transmissions (e.g. reduced overheads when the number of connected user devices is large) and some of the advantages of device-specific CSI-RS transmissions (e.g. improved throughput performance when the number of connected user devices is small).

Figure 8:
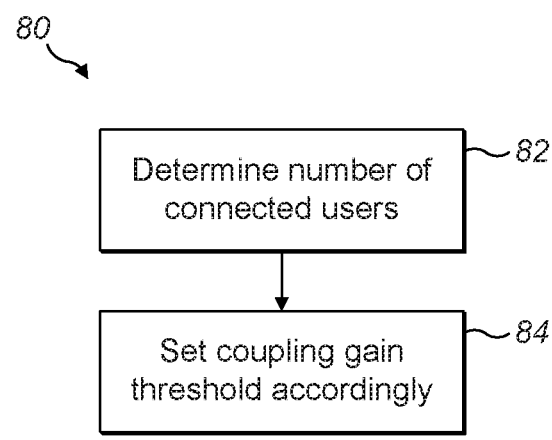

FIG. 8 is a flowchart showing an algorithm, indicated generally by the reference numeral 80, in accordance with an example embodiment. The algorithm 80 shows an example method for setting the coupling gain threshold used in the operation 74 described above.

The algorithm 80 starts at operation 82, where the number of user devices connected within the relevant cell is determined.

At operation 84, the coupling gain threshold is set. In one example embodiment, the coupling gain threshold ($CG_{thresh}$) is given by the formula:

$$CG_{thresh} = \max(CG_{optim}(\#RRC \text{ connected UEs}), CGMin_{thresh})$$

The function $CG_{optim}(\#RRC \text{ connected UEs})$ indicates the optimum coupling gain threshold for a given number of RRC connected users in the cell (i.e. the number of connected users determined in the operation 82). The $CG_{optim}$ function may depend on the radio propagation environment within the cell and may be implemented as a look up table.

The variable $CGMin_{thresh}$ is a minimum value of coupling gain threshold. This may provide a lower limit, below which device-specific CSI-RS may always be used (regardless of the number of connected devices in the cell). Setting a minimum coupling gain threshold value may ensure good cell-edge performance and coverage, by using device-specific CSI-RS for extreme cell-edge user devices.

Thus, the coupling gain threshold may be set as the maximum of the coupling gain threshold defined based on the number of RRC connected users and said minimum threshold value.

The algorithm 80 may be repeated periodically in order to update the coupling gain threshold used in the algorithm 70. However, this is not essential to all example embodiments, since aperiodic updating of the coupling gain threshold is possible.

Figure 9:
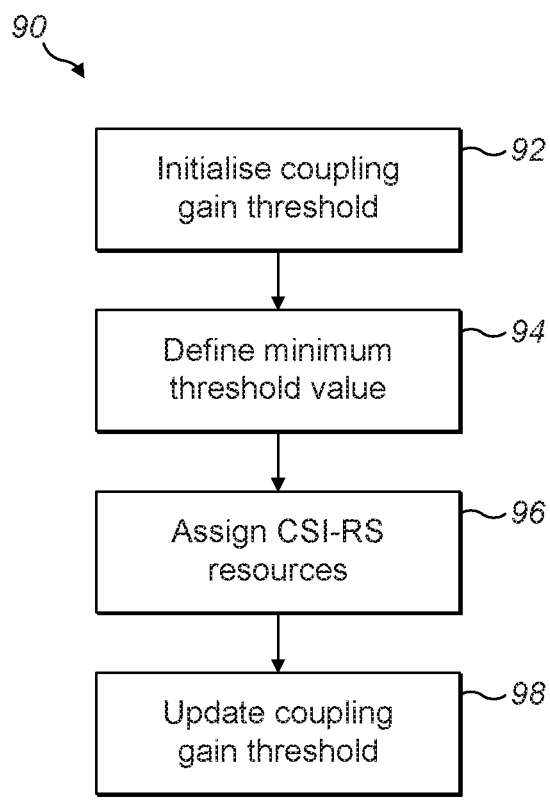

FIG. 9 is a flowchart showing an algorithm, indicated generally by the reference numeral 90, in accordance with an example embodiment.

The algorithm 90 starts at operation 92, where the coupling gain threshold $CG_{thresh}$ is set to a large value such that when the number of RRC connected users in a cell is small, any user admitted into a cell is configured with device-specific CSI-RS resources.

At operation 94, the minimum value of coupling gain $CGMin_{thresh}$ is set to a value such that very poor RF users with coupling gain less than $CGMin_{thresh}$ are always configured with device-specific CSI-RS resources irrespective of number of RRC connected users in the cell. This value can be found using simulations.

At operation 96, CSI-RS resources are assigned upon admission of a user to the cell. The operation 94 may be implemented using the algorithm 70 described above.

In the operation 96, any user admitted to the cell with coupling gain less than $CG_{thresh}$ will be assigned device-specific CSI-RS resources, in which case, CSI-RS transmissions and the subsequent PDSCH transmissions to the user will use that device-specific eigen beams or the best GoB beams for the user. Moreover, in one example embodiment a user assigned device-specific CSI-RS resources will continue to use the assigned resources for CSI-RS transmissions for the time it is associated with that cell. In another embodiment, a user's CSI-RS configuration may be re-assessed in a periodic or an event-triggered fashion based on the current value of the coupling gain of that device and the current value of $CG_{thresh}$. Other users, i.e., users with coupling gain more than $CG_{thresh}$ are assigned common cell-specific CSI-RS resources, typically, using cell-specific beams using a split panel approach, and the PDSCH transmissions to the user will use the user device-reported PMI.

At operation 98, the coupling gain threshold $CG_{thresh}$ is updated. The operation 98 may be implemented using the algorithm 80 described above.

The value of the coupling gain threshold $CG_{thresh}$ may depend on the propagation environment, load, number RRC connected users or the like and can be set independently in each cell. In case of significant difference in load or propagation environment across cells, a different threshold value can be used across cells. The coupling gain threshold value $CG_{thresh}$ may be updated periodically by looking up $CG_{optim}$ (#RRC connected UEs), which is a non-increasing function of the number of RRC connected users in the cell. $CG_{optim}$ (#RRC connected UEs) can be implemented as a look up table, and obtained typically from simulation results.

The algorithms 70 to 90 collectively described a hybrid pathloss-based CSI-RS scheme that uses cell-specific CSI-RS transmissions for some of the RRC connected users in a cell and uses device-specific CSI-RS transmissions for other users, depending on the current number of RRC connected user devices and the pathloss (or coupling gain) of the user devices. The scheme may have three general regions based on the number of RRC connected user devices, as follows:

When the number of RRC connected user devices is small, user devices may be configured to use device-specific CSI-RS transmissions.

When the number of RRC connected user devices is large, most user devices may use cell-specific CSI-RS transmissions. The exceptions are those user devices that are in the cell-edge with very large pathloss (i.e. very small coupling gain) that would receive extremely poor performance without using device-specific CSI-RS transmissions.

In a middle region (i.e. between the two extremes described above), there may be an adaptive threshold that is used to determine which user devices use device-specific CSI-RS transmissions, and which user devices use cell-specific CSI-RS transmissions. Those user devices with a coupling gain lower than this threshold receive device-specific CSI-RS, and those with a coupling gain more than this threshold receive cell-specific CSI-RS configuration. This threshold is also adapted such that the threshold becomes smaller with increasing number of RRC connected user devices, thus tightening the requirement for user devices to receive device-specific CSI-RS transmissions.

Figure 10:
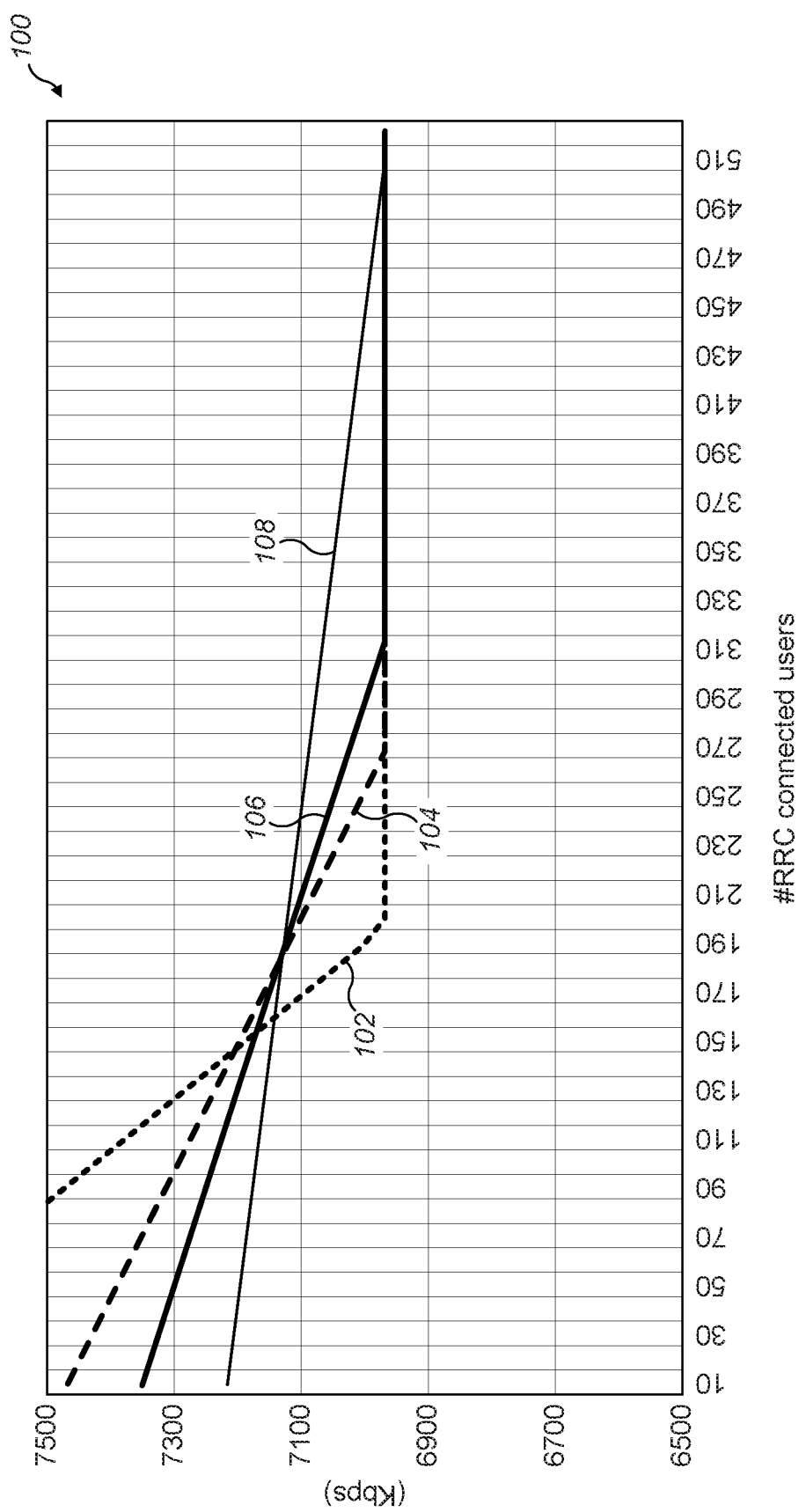
FIG. 10 is a plot in accordance with an example embodiment.

FIG. 10 is a plot, indicated generally by the reference numeral 100, in accordance with an example embodiment. The plot 100 shows the geometric mean of user device throughputs per cell as a function of the number of RRC connected user devices for different values of the coupling gain threshold. As described above, the coupling gain threshold determines the user devices that use device-specific CSI-RS transmissions.

Specifically, the plot 100 includes a first plot 102, a second plot 104, a third plot 106 and a fourth plot 108 for which the coupling gain threshold is −130 dB, −138 dB, −142 dB and −150 dB respectively.

It is clear from the plot 100 that in order to obtain the best performance as the number of RRC connected user devices changes, the coupling gain threshold should change. In this way, it is possible to operate in the optimum envelope of all the plots 102 to 108. Specifically, as the number of RRC connected user devices increases, the optimal coupling gain threshold below which user devices should receive device-specific CSI-RS further decreases. Based on this, we can identify the three regimes referred to above:

Region 1: Small number of RRC connected user devices. The best geomean performance in this region is achieved when all users use device-specific CSI-RS resources. Here, higher beamforming gain associated with device-specific beams is more dominant when compared to the larger CSI-RS resource overhead with device-specific beams Region 2: Medium number of RRC connected user devices. With an increase in the number of RRC connected users, the increased CSI-RS overhead starts impacting the throughput performance, and therefore all users cannot be given device-specific CSI-RS resources. From the plot 100, it can be observed that with more than ~100 RRC connected user devices, the best geo-mean performance can be achieved if cell-edge user devices beyond a certain pathloss or below a coupling gain threshold use device-specific CSI-RS, and the remaining user devices use cell-specific CSI-RS. This threshold progressively decreases with an increase in number of RRC connected users, thus requiring user devices to have a lower coupling gain to get device-specific CSI-RS resources as the number of RRC connected user devices increase.

Region 3: Large number of RRC connected user devices. With a further increase in the number of RRC connected users, it is better to switch to a scheme where all users in the cell use cell-specific CSI-RS resources instead of using the hybrid scheme where a fraction of users use device-specific CSI-RS resources. However, this may mean that the system may be unable to serve some of the poor RF users because of reduced coverage of cell-specific beams used with cell-specific CSI-RS transmissions. This last issue may be addressed by providing a minimum value of coupling gain ($CGMin_{thresh}$) as discussed above. For example, when the number of RRC connected users is more than a threshold (e.g. 500 users), the coupling gain threshold may be fixed to $CGMin_{thresh}$ such that all users with a coupling gain value less than $CGMin_{thresh}$ will be assigned device-specific CSI-RS resources in order to seek to alleviate the problem of very poor performance associated with cell-specific CSI-RS resources for extreme cell-edge user devices.

The current operating region and the adaptive threshold in region 2 can be re-adjusted based on the current number of RRC connected users in the cell.

Moreover, as discussed above, to avoid RRC reconfiguration messages, a user once designated to use device-specific CSI-RS transmissions may continue to use device-specific CSI-RS transmissions, i.e., CSI-RS resources for the user remain unchanged until a handover happens. In another embodiment, user devices' configuration of cell-specific or device-specific CSI-RS may be re-assessed periodically or in an event-triggered fashion based on the current coupling gain for that user device and the current value of the parameter $CG_{thresh}$.

Figure 11:
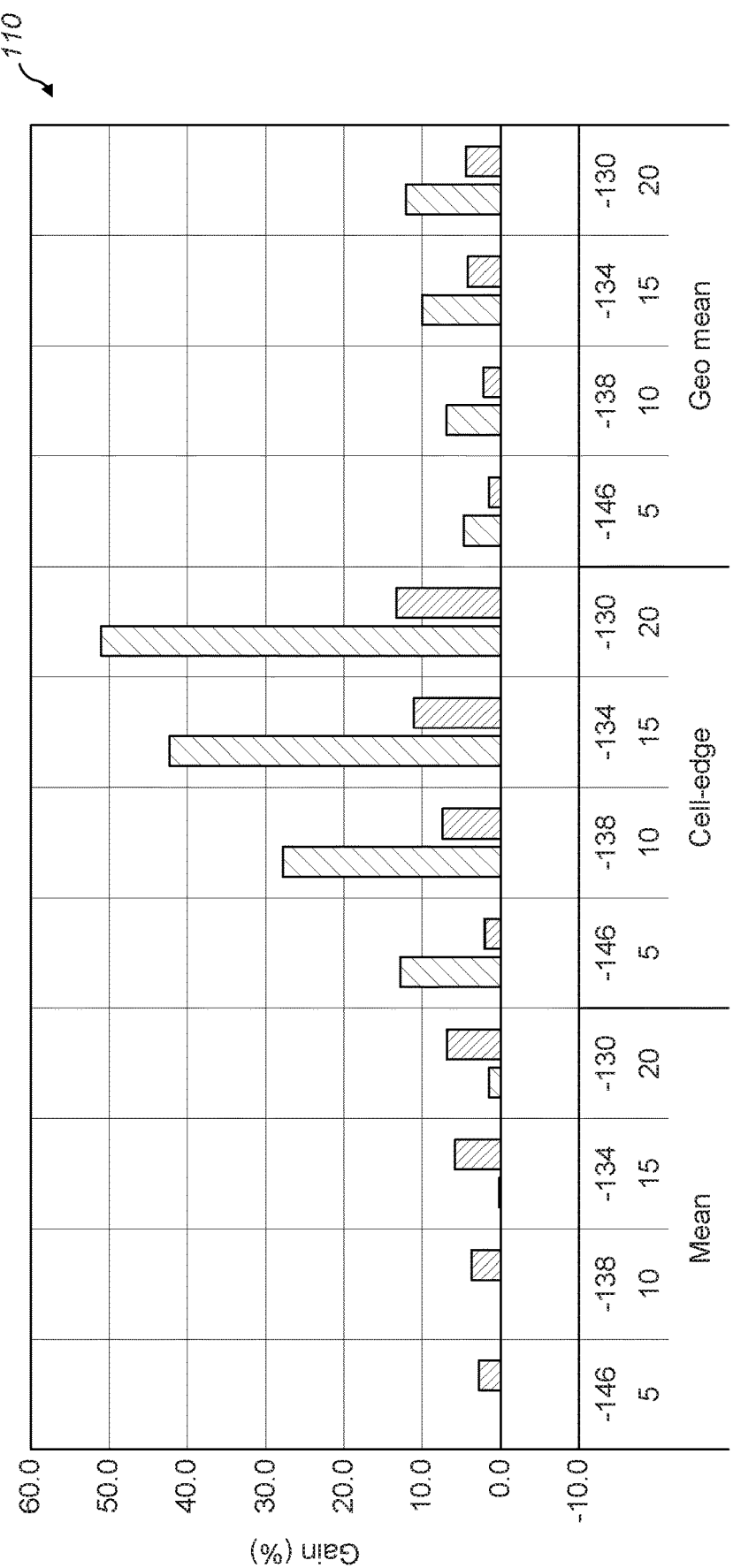
FIG. 11 shows simulation results in accordance with an example embodiment.

FIG. 11 is a plot, indicated generally by the reference numeral 110, showing simulation results in accordance with an example embodiment.

In FIG. 11, we compare the geometric mean performance (with 10 active users) of the hybrid (coupling gain-based) CSI-RS transmission scheme described above with a hybrid (random) scheme against a baseline scheme where all users use cell-specific CSI-RS resources. Both of the hybrid schemes (i.e. the pathloss-based and random hybrid schemes) allow the same number of users to receive device-specific CSI-RS transmissions. Further, for the hybrid (random) scheme, a random set of user devices are configured for device-specific CSI-RS transmissions, whereas for the hybrid (coupling gain-based) scheme, only users with pathloss value greater than the chosen threshold (or, equivalently, coupling gain less than an appropriate threshold) are configured with device-specific CSI-RS resources. In both the hybrid schemes, all other users are assigned cell-specific CSI-RS resources.

For the hybrid (coupling gain-based) scheme, simulations were run for coupling gain thresholds of −130, −134, −138 and −146 dB corresponding to roughly 20, 15, 10 and 5 percent of users with a coupling gain less than this threshold value in the simulations. Correspondingly, for the hybrid (random) scheme, simulations were done with 20, 15, 10 and 5 percent of the users being assigned device-specific CSI-RS resources at random. For each data point on the plot 110, the percentage throughput gain of the hybrid (random) scheme relative to baseline (cell-specific) transmissions is plotted on the right and the performance of the hybrid (coupling gain) scheme relative to the baseline transmissions is plotted on the left.

From FIG. 11, we see significant gains (>50%) in cell-edge and 10-12% gains in geometric mean of user device throughput with the hybrid (coupling gain-based) scheme over the baseline scheme. In comparison, the hybrid (random) has only 10-12% gains in cell-edge over the baseline scheme. As expected, the hybrid (random) scheme also performs better than the baseline scheme because a fraction of users use device-specific CSI-RS transmissions (i.e., both CSI-RS and data transmissions) to these users will have a higher rank and SINR and hence higher throughput. The hybrid (random) scheme does not perform as well as the hybrid (coupling gain-based) scheme because with the hybrid (coupling gain-based) scheme, cell-edge users are preferentially allocated device-specific CSI-RS resources.

Figure 12:
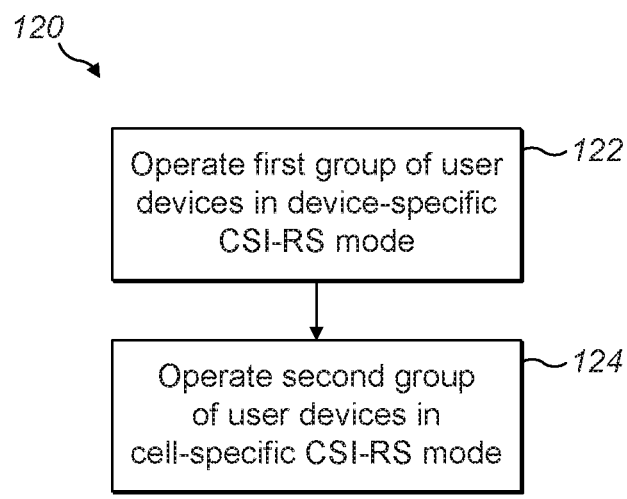
FIG. 12 is a flowchart showing an algorithm in accordance with an example embodiment.

FIG. 12 is a flowchart showing an algorithm, indicated generally by the reference numeral 120, in accordance with an example embodiment.

The algorithm 120 starts at operation 122, where a first group of one or more user devices within a cell of a mobile communication system is operated in a device-specific CSI-RS mode of operation in which the user devices of the first group use device-specific reference signal transmissions for the determination of channel state information. The user devices may operate in the device-specific CSI-RS mode of operation in the event that a determined coupling gain for the respective user device is less than a coupling gain threshold.

At operation 124, a second group of one or more of said user devices within the cell of the mobile communication system is operated in a cell-specific CSI-RS mode of operation in which the user devices of the second group use cell-specific reference signal transmissions for the determination of channel state information. The user devices may operate in the cell-specific CSI-RS mode of operation in the event that the determined coupling gain for the respective user device is not less than the coupling gain threshold.

The algorithm 120 may be implemented using the system 10 in which the user devices 14 to 17 operate in the device-specific or cell-specific mode of operation depending on the coupling gain for the respective user device relative to a coupling gain threshold.

The embodiments described above generally consider coupling gains and coupling gain thresholds. As noted above, coupling gain is a measure of pathloss and the terms coupling gain and pathloss can, in some circumstances, be used interchangeably.

Figure 13:
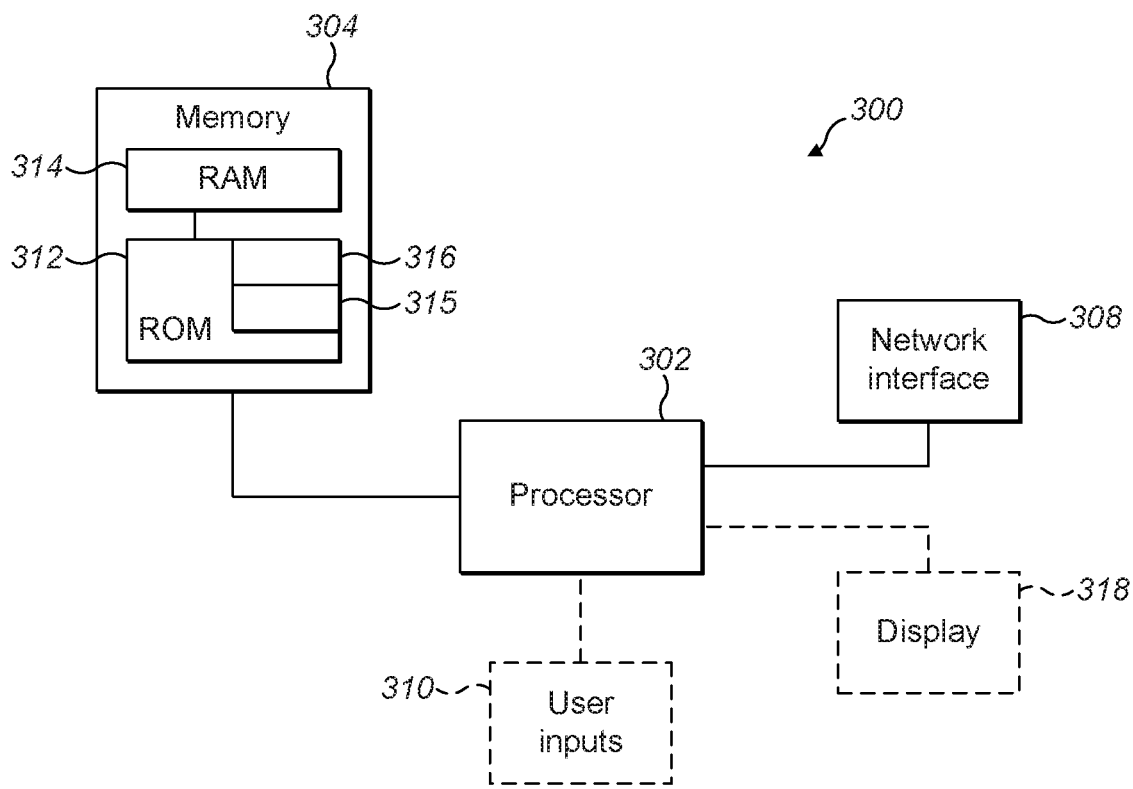
FIG. 13 is a block diagram of components of a system in accordance with an example embodiment.

For completeness, FIG. 13 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 20, 70, 80, 90 and 120 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 14A:
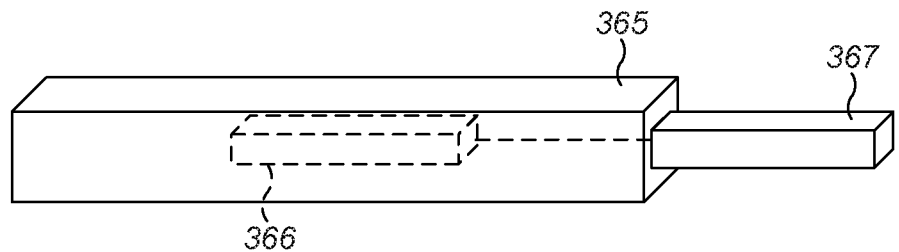
FIGS. 14A and 14B show tangible media, respectively a removable non-volatile memory unit and a Compact Disc (CD) storing computer-readable code which when run by a computer perform operations according to example embodiments.
Figure 14B:
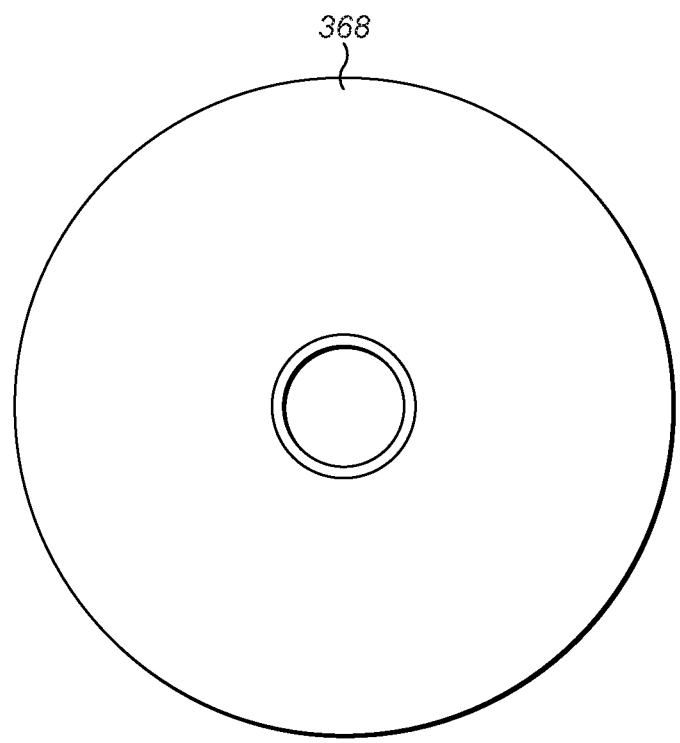

FIGS. 14A and 14B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2, 7, 8, 9 and 12 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus, comprising:
   at least one processor; and
   at least one memory including computer program code;
   wherein the at least one memory and the computer program code are configured to, with the at least one processor, cause the apparatus at least to:
   determine a coupling gain for a user device within a cell of a mobile communication system;
   compare the determined coupling gain with a coupling gain threshold;

set the user device to operate in a device-specific CSI-RS mode of operation in the event that the determined coupling gain is less than the coupling gain threshold, wherein, in the device-specific CSI-RS mode of operation, the user device is configured to use device-specific reference signal transmissions for a determination of channel state information; and set the user device to operate in a cell-specific CSI-RS mode of operation in the event that the determined coupling gain is not less than the coupling gain threshold, wherein, in the cell-specific CSI-RS mode of operation, the user device is configured to use cell-specific reference signal transmissions for the determination of channel state information.

2. The apparatus as claimed in claim 1, wherein the at least one processor is further configured to perform:
setting said coupling gain threshold.

3. The apparatus as claimed in claim 2, wherein said coupling gain threshold is based, at least in part, on a defined coupling gain threshold based on a number of connected user devices within the cell of the mobile communication system.

4. The apparatus as claimed in claim 3, wherein the at least one processor is further configured to perform:
determine or obtain the number of connected users within the cell of the mobile communication system; and
set the defined coupling gain threshold depending on the number of connected users.

5. The apparatus as claimed in claim 3, wherein said coupling gain threshold is based, at least in part, on a minimum threshold value.

6. The apparatus as claimed in claim 5, wherein said coupling gain threshold is the larger of said defined coupling gain threshold and said minimum threshold value.

7. The apparatus as claimed in claim 1, wherein the set CSI-RS mode of operation is retained whilst the user device remains within the cell of said mobile communication system.

8. The apparatus as claimed in claim 1, wherein the set CSI-RS mode of operation is reassessed periodically or in response to an event, wherein the reassessment of the CSI-RS mode of operation is based on the coupling gain of the user device and the coupling gain threshold at the time at which the CSI-RS mode operation is reassessed.

9. The apparatus as claimed in claim 1, wherein the at least one processor is further configured to perform:
providing downlink reference signal transmissions in accordance with the set CSI-RS mode of operation; and
determining channel state information in response to the provided downlink reference signal transmissions.

10. The apparatus as claimed in claim 1, wherein all user devices within a cell operating in the device-specific CSI-RS mode of operation use orthogonal resources for CSI-RS reference signal transmissions.

11. The apparatus as claimed claim 1, wherein all user devices within a cell operating in the cell-specific CSI-RS mode of operation use the same resources for CSI-RS reference signal transmissions.

12. A method, comprising:
determining a coupling gain for a user device within a cell of a mobile communication system;
comparing the determined coupling gain with a coupling gain threshold;
setting the user device to operate in a device-specific CSI-RS mode of operation in the event that the determined coupling gain is less than the coupling gain threshold, wherein, in the device-specific CSI-RS mode of operation, the user device is configured to use device-specific reference signal transmissions for the determination of channel state information; and
setting the user device to operate in a cell-specific CSI-RS mode of operation in the event that the determined coupling gain is not less than the coupling gain threshold, wherein, in the cell-specific CSI-RS mode of operation, the user device is configured to use cell-specific reference signal transmissions for the determination of channel state information.

13. A method, comprising:
operating a first group of one or more user devices within a cell of a mobile communication system in a device-specific CSI-RS mode of operation in which the user devices of the first group use device-specific reference signal transmissions for a determination of channel state information, wherein user devices operate in the device-specific CSI-RS mode of operation in the event that a determined coupling gain for the respective user device is less than a coupling gain threshold; and
operating a second group of one or more said user devices within the cell of the mobile communication system in a cell-specific CSI-RS mode of operation in which the user devices of the second group use cell-specific reference signal transmissions for the determination of channel state information, wherein user devices operate in the cell-specific CSI-RS mode of operation in the event that the determined coupling gain for the respective user device is not less than the coupling gain threshold.

14. A non-transitory computer-readable medium having computer-readable instructions encoded thereupon, said instructions configured, when executed on an apparatus, to cause the apparatus to perform at least the following:
determining a coupling gain for a user device within a cell of a mobile communication system;
comparing the determined coupling gain with a coupling gain threshold;
setting the user device to operate in a device-specific CSI-RS mode of operation in the event that the determined coupling gain is less than the coupling gain threshold, wherein, in the device-specific CSI-RS mode of operation, the user device is configured to use device-specific reference signal transmissions for a determination of channel state information; and
setting the user device to operate is a cell-specific CSI-RS mode of operation in the event that the determined coupling gain is not less than the coupling gain threshold, wherein, in the cell-specific CSI-RS mode of operation, the user device is configured to use cell-specific reference signal transmissions for the determination of channel state information.

\* \* \* \* \*